3,708,571
PREPARATION OF FLUORAMINE

Vytautas Grakauskas, Arcadia, Calif., assignor to the United States of America as represented by the Secretary of the Navy
No Drawing. Filed Sept. 30, 1966, Ser. No. 584,060
Int. Cl. C01 21/52
U.S. Cl. 423—413   8 Claims

ABSTRACT OF THE DISCLOSURE

There is disclosed a process of preparing fluoramine. A solution of ethyl N-fluorocarbamate in concentrated sulfuric acid is heated to 90–95° C. carbon dioxide being thereby evolved. Upon dilution with water fluoramine is generated in situ.

---

This invention relates to fluoramine and, more particularly, to a novel process for preparing the same.

Fluoramine is the only unknown member in the fluorinated ammonia series. The compound is considered to be an important intermediate in synthetic chemistry, its importance being similar to that of chloramine. Fluoramine, for example, has been shown to react with aldehydes to give the corresponding nitriles and with ketones to give the corresponding amides. Fluoramine also may be used as a monopropellant.

An object of this invention is to provide a novel process of preparing fluoramine by hydrolyzing ethyl N-fluorocarbamate.

Other objects and many of the attendant advantages of this invention will be readily appreciated as the same becomes better understood by reference to the following description:

The process of this invention comprises hydrolyzing ethyl N-fluorocarbamate with sulfuric acid.

Fluoramine can be prepared by hydrolysis of certain N-F compounds as shown in the following general equation:

$$\text{RCONHF} \xrightarrow[\Delta]{\text{HX}} \text{H}_2\text{NF}$$

where:

HX=a strong acid such as sulfuric, perchloric, methylsulfonic, etc.;
R=an alkyl, aryl, cyclic or heterocyclic group.

R also can be alkoxy or amino, or substituted amino group. When R is a fluoramino group (NHF), the above reaction would give two moles of fluoramine per mole of substrate.

A solution of five grams of ethyl N-fluorocarbamate in 20 ml. of concentrated sulfuric acid was heated gradually to 95° C. A vigorous evolution of carbon dioxide began at 50°–55° C. and the evolution of gas was completed in 10–15 minutes at 90°–95° C. The solution was cooled to room temperature and was ready for reactions. $F^{19}$ NMR spectrum of the sulfuric acid solution showed the presence of $\text{NH}_3\text{F}^\oplus$ ions.

The $\text{NH}_3\text{F}^\oplus$ ions resulted from the compound $\text{H}_2\text{NF}$, being a weak base, undergoing protonation in concentrated sulphuric acid in accordance with the following equation:

$$\text{H}_2\text{NF} + \text{H}^\oplus \rightarrow \text{NH}_3\text{F}$$

The ethyl N-fluorocarbamate was hydrolyzed with concentrated sulfuric acid to prepare the $\text{H}_2\text{NF}$ as follows:

$$\text{NHFCOOC}_2\text{H}_5 \xrightarrow{\text{conc. H}_2\text{SO}_4} \text{H}_2\text{NF} + \text{CO}_2 + \text{H}_2\text{SO}_4$$

Thus, the result of the reaction was the formation of an N-fluoroammonium salt. The fluoramine itself could not be isolated. Its presence, however, has been demonstrated in its reaction with carbonyl compounds.

When the concentrated sulfuric acid solution containing $\text{NH}_3\text{F}^\oplus$ was diluted with water, fluoramine probably was generated in situ:

$$\text{NH}_3\text{F}^\oplus + \text{H}_2\text{O} \rightarrow \text{H}_2\text{NF} + \text{H}_3\text{O}^\oplus$$

However, fluoramine apparently is not stable under these conditions and undergoes fast decomposition. A comparable instability of chloramine is well known.

The in situ presence of fluoramine in the solutions stated above has been demonstrated by its reaction with aqueous aldehydes and ketones. The sulfuric acid hydrolysate was shown to react with aqueous aldehydes to give the corresponding nitriles as follows:

$$\text{RCHO} + [\text{H}_2\text{NF}] \rightarrow \text{RC}\equiv\text{N} + \text{HF} + \text{H}_2\text{O}$$

A similar reaction of aromatic aldehydes with chloramine is well known.

Fluoramine also reacts with ketones as shown by the following:

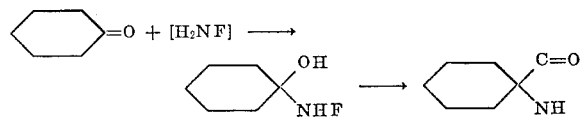

Although fluoramine is hydrolytically unstable, its solution in concentrated sulfuric acid may be stored at room temperature indefinitely. When desired, the compound can be generated in situ by diluting such solutions with water.

It is apparent from the foregoing description that I have invented a novel process for preparing fluoramine. Obviously, many modifications and variations of the present discovery will become apparent to one skilled in the art in view of the above teaching, so that it is to be understood that this invention, as set forth in the appended claims, may be practiced otherwise than as described.

What is claimed is:

1. A process for the preparation of fluoramine which comprises hydrolyzing ethyl N-fluorocarbamate with concentrated sulfuric acid.

2. The process of claim 1 wherein the step of hydrolyzing is accomplished at a gradually increasing temperature from about 22° C. to about 95° C.

3. The process of claim 2 and further including the step of diluting the solution with water whereby fluoramine is generated in situ.

4. A process for the preparation of fluoramine which comprises heating a solution of five grams of ethyl N-fluorocarbamate in 20 ml. concentrated sulfuric acid gradually from room temperature to about 95° C. for a period of at least 10–15 minutes, cooling the solution to room temperature, and diluting the solution with water, whereby fluoramine is generated in situ.

5. A process for the preparation of fluoramine which comprises hydrolyzing N-F compounds in accordance with the general equation $$\text{RCONHF} \xrightarrow[\Delta]{\text{HX}} \text{H}_2\text{NF}$$

where HX is one of a group of strong acids selected from the group consisting of sulfuric, perchloric or methylsulfonic and R is selected from the group consisting of alkyls, aryls, cyclics or heterocyclics.

6. The process of claim 5 wherein R is of the fluoramino group, the reaction producing two moles of fluoramine per mole of substrate.

7. The process of claim 5 wherein the step of hydrolyzing is accomplished at a gradually increasing temperature from about 22° C. to about 95° C.

8. The process of claim 7 and further including the step of diluting the solution with water whereby fluoramine is generated by situ.

References Cited
UNITED STATES PATENTS

| | | | |
|---|---|---|---|
| 3,077,377 | 2/1963 | Lawton et al. | 23—356 |
| 3,084,025 | 4/1963 | Gardner et al. | 23—356 |
| 3,101,997 | 8/1963 | Freeman et al. | 23—356 |
| 3,103,456 | 9/1963 | Lawton et al. | 149—1 |
| 3,134,815 | 5/1964 | Burkert et al. | 260—583 |

OTHER REFERENCES

Stacey: Advances in Fluorine Chemistry, vol. 4, (1965), pp. 193–4.

REUBEN EPSTEIN, Primary Examiner

U.S. Cl. X.R.

149—109